United States Patent [19]

Kidder et al.

[11] Patent Number: 4,656,835
[45] Date of Patent: Apr. 14, 1987

[54] DEMAND LIMIT CONTROL BY INTEGRAL RESET OF THERMOSTATS

[75] Inventors: Kenneth B. Kidder, Coon Rapids, Minn.; Gary A. Smith, Albuquerque, N. Mex.; Paul C. Wacker, St. Louis Park, Minn.

[73] Assignee: Honeywell Inc., Minneapolis, Minn.

[21] Appl. No.: 907,548

[22] Filed: Sep. 15, 1986

[51] Int. Cl.⁴ ............................................. F25B 7/00
[52] U.S. Cl. .................................. 62/175; 236/78 D; 364/161; 307/39
[58] Field of Search ............... 236/46 R, 78 D, 1 EA; 165/12, 26, 22; 364/161; 307/39, 41; 62/175

[56] References Cited

U.S. PATENT DOCUMENTS

| | | | |
|---|---|---|---|
| 4,010,412 | 3/1977 | Forman | 323/18 |
| 4,228,511 | 10/1980 | Simcoe | 307/39 X |
| 4,272,012 | 6/1981 | Molnar et al. | 236/1 |
| 4,276,925 | 7/1981 | Palmieri | 165/12 |
| 4,356,962 | 11/1982 | Levine | 236/11 |
| 4,387,763 | 6/1983 | Benton | 307/39 X |
| 4,408,711 | 10/1983 | Levine | 236/11 |
| 4,446,359 | 5/1984 | Arribas et al. | 219/485 |
| 4,473,183 | 9/1984 | Kensinger et al. | 236/46 R |
| 4,501,125 | 2/1985 | Han | 62/175 |
| 4,509,585 | 4/1985 | Carney et al. | 165/12 |
| 4,542,849 | 9/1985 | Pichot et al. | 307/39 X |

OTHER PUBLICATIONS

Honeywell Installation and Instruction Sheet Form Number 63-2013-2, Revised 2-85, Entitled Programmable Commercial Thermostat-T7400A, B & W7400/W7401 A,B,C,D.

Primary Examiner—William E. Wayner
Attorney, Agent, or Firm—Alfred N. Feldman

[57] ABSTRACT

A temperature control system for a building is disclosed utilizing a central demand limit controller. The system includes a number of control modules or thermostats that have both proportional error and integral error functions. The integral error is reset at intervals by an interstage differential to drop single stages of air conditioning. This reduces demand until the maximum allowed demand is met. The integral error function is a timed function and the stages return in a random manner to restore setpoint temperature.

7 Claims, 2 Drawing Figures

DEMAND LIMIT CONTROL BY INTEGRAL RESET OF THERMOSTATS

BACKGROUND OF THE INVENTION

In commercial buildings electrical peaks, or predetermined electrical load limits, are usually set on hot days due to large air conditioning requirements. Electrical demand limiting can save significant money if an effective way of dealing with the peak demand of air conditioning can be accomplished. One way to deal with the problem is by selectively raising zone thermostat setpoints to shed electrical load when demand approaches a perdetermined limit. This has been done previously by actually raising the setpoint of each thermostat which controls a zone temperature. The technique of raising the thermostat setpoint during demand periods is somewhat effective, but also has some drawbacks.

To be effective, the load should be somewhat responsive such that when high demand occurs, shedding the load will provide immediate electrical reduction. When the demand drops, the load should be brought back to normal so that the load can be shed again for load reduction at the occurance of a subsequent peak. After a thermostat setpoint has been raised, it requires a slow recovery to the normal setpoint to avoid bringing on too many cooling stages simultaneously, and thereby causing another peak demand situation. This mean that the scheme of raising a setpoint is not very dynamic since a setpoint can not successfully recover for approximately forty five minutes to one hour after the setpoint has been raised. This scheme will not make the most efficient use of the controlled loads for limiting the electrical demand in a building.

SUMMARY OF THE INVENTION

The present invention provides a different scheme than that described above. To make more efficient use of the shedable loads, while still maintaining good control of the space temperatures effected, load shedding of air conditioning loads can be accomplished in the manner described below.

The disclosed novel scheme involves using thermostats which can be signalled from a central demand limit controller to reset their integral errors. This requires that the thermostats employ proportional plus integral error in their control algorithms. A thermostat or control module identified as a W7400, and manufactured and sold by Honeywell Inc., utilizes a system that senses current space temperature and compares it to the programmed setpoint to determine the current deviation from setpoint. This measured comparison is referred to as proportional error. In addition, the W7400 is always aware of the length of time that the deviation is present. This is referred to as integral error. The W7400 utilizes a control scheme involving both the proportional error and the integral error and these schemes are commonly referred to as "PI" or "P+I" control.

When a central controller signals the thermostat, it will decrease the integral portion of the error signal by a set number of degrees. Normally this is two degrees Fahrenheit and under most circumstances this is equal to the interstage differential used in the cooling equipment. This will cause the thermostat to remove a single stage of cooling if any stages are currently operating. Due to the fact that the interstage differential of the cooling units is used, this guarantees that no more than one stage will be shed at a time when a call for load shedding is commanded.

This means that the controller has a more dynamic response than the setpoint adjustment scheme since that may entail more than one stage of shedding per call for the system to shed load. In the setpoint adjustment scheme, if more than one stage is shed and that is not needed at that time, then it will be unavailable for approximately one half of an hour or longer thereafter. If more load shedding is required its lack of availability will make the operation uneven.

The present invention assure that comfort is to be maintained in the zone and the temperature can not continue to be raised indefinately. Normally a rise of more than three degrees Fahrenheit from the original setpoint is the maximum allowable where a good degree of comfort is to be maintained. In certain types of peak load situations, if a setpoint change is used, it could even be possible to cause new peaks when the setpoint is brought back since multiple stages might be calling for operation to drive down the temperature from the higher setpoint level.

The novel strategy of bumping or changing the integral error causes load reduction without changing the setpoint and therefore gives a smoother return to the original operation as the integral error slowly recovers. As was indicated previously, the integral error is a function of length of time of the deviation of the temperature in the control system.

The overall control strategy of the present invention is therefore to have a central controller which motitors electrical load. When the demand surpasses a programmed or set limit for a specific interval of time (one or two minutes), the central controller sends a signal to a zone thermostat to decrement the integral error by the interstage differential. This will cause a stage of cooling to be turned off if the zone's air conditioning equipment is in fact contributing to the high demand. If after a set period of time, and the demand stays above the setpoint, a second thermostat in the overall system will be signalled to decrement its integral error. As long as the demand is above the setpoint a new thermostat will be signalled to decrement its integral error at set intervals of time (typically two minutes). Once a thermostat has its integral error decremented, it will be signalled to decrement again every fifteen minutes. This will cause the thermostat to control to a higher setpoint, and therefore, keep the long term electrical demand of the environmental or air conditioning means down for the duration of the peak usage. When the signalling of the decrementing stops, the integral error will gradually recover and the zone temperature will be brought back to normal without any sudden changes in the number of stages needed.

In accordance with the present invention, there is provided a temperature control system for an environmentally controlled space having a central demand limit controller, including: thermostat means with said thermostat means including proportional error means and integral error means; said central demand limit controller connected to said thermostat means with said central demand control means being capable of remotely changing an integral error of said integral error means; electrical load sensing means for sensing an electrical demand including electrical power drawn by environmental conditioning means for said controlled space; and said central demand limit controller periodically decrementing said integral error by a fixed amount upon electrical demand for said space exceeding a predetermined limit.

BRIEF DESCRIPTION OF THE DRAWINGS

FIG. 1 generally discloses a temperature control system 10 for an environmentally controlled space 11. More specifically, the environmentally controlled space 11 is a small office building with a number of zone thermostats, zone control modules, or thermostat means 12, 13, and 14 that in turn control a plurality of environmental conditioning means 15, 16, and 17. The zone control modules 12, 13, and 14 typically would be multi-stage thermostats and could be of the type manufactured and sold by Honeywell Inc. and identified as the W7400 Single Zone Control Module. The details of the modules will not be explained except to the extent that they implement the present invention. The specific functions utilized in the implementation will be enumerated subsequently. The environmental conditioning means 15, 16, and 17 are conventional heating, ventilating, and air conditioning systems with the air conditioning accomplished by multistage compressor operated cooling or refrigeration. These units are electrically operated and create a significant electrical demand for the environmentally controlled space 11. The invention herein is directed to load shedding or control of the environmental conditioning means 15, 16 and 17 so as to maintain the electrical power drawn by these units at or below some set predetermined level.

Figure 1:
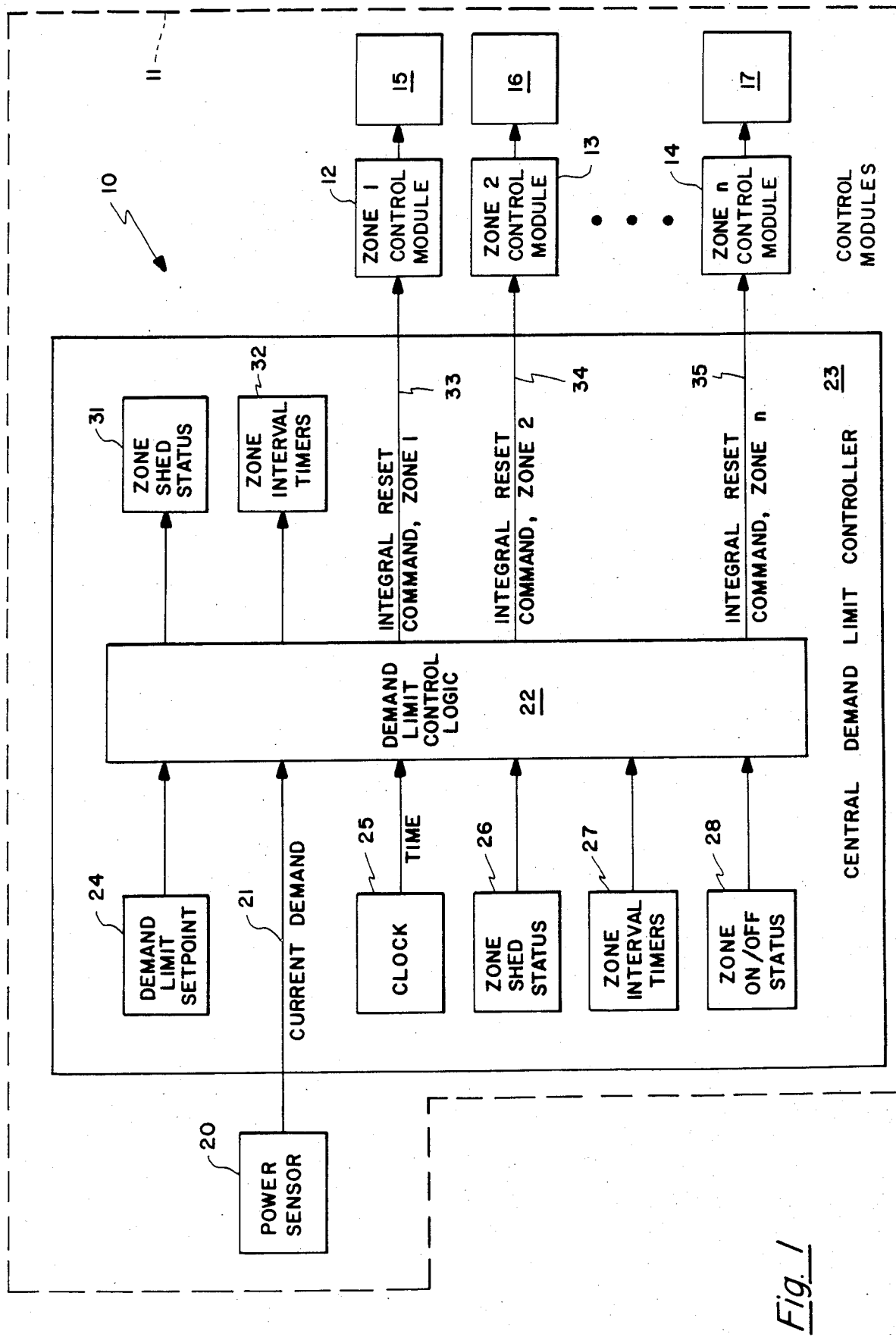
FIG. 1 is a block diagram of a novel system.

Associated with the environmentally controlled space or building 11 is power a sensor 20 in the form of an electrical load sensing means such as a watt transducer or a watt-hour pulse meter. The power sensor 20 continuously measures the amount of electrical energy being drawn by the building 11, and supplies that information on conductor 21 to a demand limit control logic element 22 that forms part of a central demand limit controller 23. The central demand limit controller 23 has a input or setpoint device 24 for introducing a demand limit setpoint to the demand limit control logic 22. Also supplied to demand limit control logic 22 is a clock signal from clock 25, status information at 26 from the various zones of the building 11, zone interval timers 27 for supplying separating times of control of the associated zones, and a status indicator 28 giving zone on/off status for the various zones in the building 11.

The information supplied by the power sensor 20, the demand limit setpoint 24, the clock 25, the zone shed status indicators 26, the zone interval timers 27, and the zone on/off status indicators 28 are all fed to the demand limit control logic 22 where an appropriate microcomputer function occurs to implement the present invention. The demand limit control logic 22 has a number of outputs including an output to a zone shed status indicator 31, and zone interval timers 32. The demand limit control logic 22 also supplies on conductors 33, 34, and 35 an integral reset command to the zone thermostats or control modules 12, 13 and 14. The modules 12, 13 and 14 each have internal electronic systems for measuring the proportional error and integral error.

The modules 12, 13, and 14 are capable of sensing current space temperature in their individual zones and comparing it to a programmed setpoint for that zone to determine the current variation from the setpoint. This is the proportional error. In addition, these thermostats are each capable of always being aware of the length of time that the deviation from the setpoint is present and that is identified as the integral error. These modules are capable of receiving reset signals on conductors 33, 34, and 35 which alter the integral error for the associated module or thermostat. By providing an integral command, such as on conductor 33, the module 12 can have its integral error altered to effectively raise the temperature at which the module 12 controls the zone for which it is associataed. Since the integral error is a function that varies with time, the fact that the change is programmed causes a raising of the effective temperature control for that zone, but the reversion to the original setpoint immediately begins and is a gradual change in nature.

The overall control strategy of the present invention is therefore to have the central demand limit controller 23 monitor the electrical demand for the building 11 by the power sensor 20. When the demand surpasses a programmed limit set by the demand limit setpoint 24 for a specific time (typically one or two minutes), the central demand limit controller 23 sends a signal to a zone thermostat or module 12, 13, or 14 to decrement the integral error by some predetermined fixed amount. Typically the predetermined fixed amount would be the interstage differential of the cooling stages of the environmental conditioning means 15, 16, or 17. This will cause a single stage of cooling to be turned off in a zone if the zone's air conditioning is in fact contributing to the high demand sensed by the power sensor 20.

If after a fixed period of time (typically one to two minutes), and the demand stays above the setpoint of the demand limit setpoint 24, a second module or thermostat such as 13 will be signalled at 34 to decrement its integral error by the interstage differential to cause one cooling stage of the environmental conditioning means 16 to be dropped. As long as the demand is above the setpoint of the demand limit setpoint member 24, as sensed by the power sensor 20, an additional module will be signalled to decrement its integral error every two minutes.

This progresses through all of the modules or thermostats until it reaches module 14 at zone N for the building 11. Once a module has had its integral error decremented, it will be signalled to decrement again at some relatively long fixed interval of time. The interval of time associated with this type of system typically would be fifteen minutes. The decrementing at fifteen minute intervals will cause the thermostat to control at a higher setpoint and therefore, keep the long term electrical demand for building 11 below the setpoint limit from the demand setpoint 24 as sensed by the power sensor 20. This continues through the entire duration of peak usage.

When the signalling for decrementing ends, the integral error of each of the modules involved will gradually recover and the zone temperatures associated with each of the modules will be brought back to normal. Since the modules normal control returns by a change in the integral error, which is a function of the length of time of the deviation from the setpoint, there will be no sudden changes in the number of stages needed. The air conditioning compressors in the environmental conditioning means 15, 16 and 17 will be brought on in a slow random manner.

As can be seen with the present arrangement, wherein the integral error of the thermostats or modules in the various zones is decremented by the central demand limit controller 23, a control of the total power used by the building 11 can be retained at or below the demand limit set by the setpoint 24. Also, at the resumption of normal control, the environmental conditioning means 15, 16, and 17 will be brought back into operation in a slow random manner. This type of arrangement provides a much smoother restoration of the correct ambient temperature in the various zones than in previous systems where the setpoints have been altered in order to maintain the load below a set limit.

Figure 2:
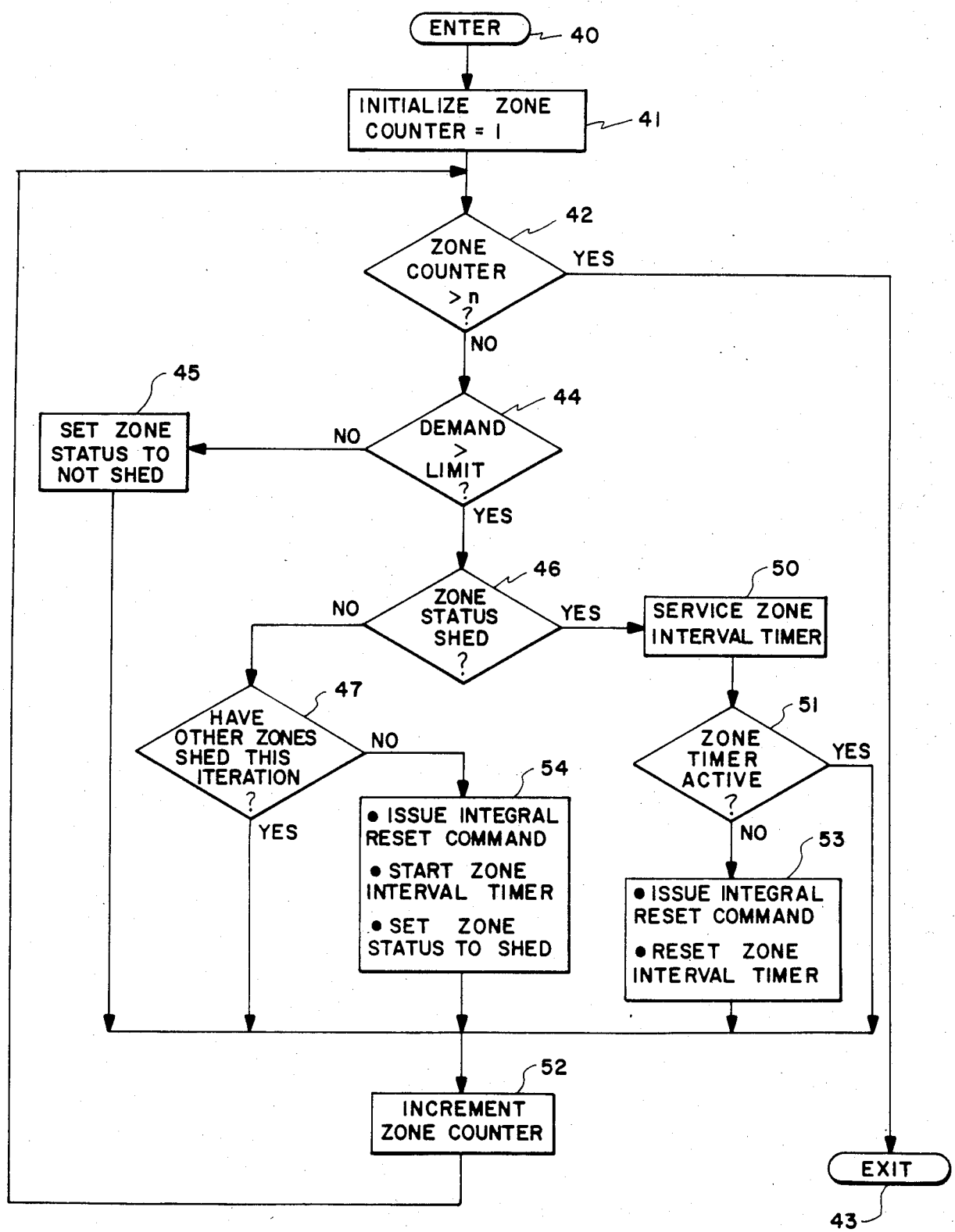
FIG. 2 is a flow chart of the operation of the novel concept.

In FIG. 2 there is a flow chart of the integral reset command function of the central demand limit controller 23. At 40 you enter the program and initialize the zone with a counter at 1. At 42 the zone counter is queried as to whether the count is greater than the number of zones. If it is, an exit is generated at 43. If it isn't, a determination is made at 44 as to whether or not the demand is greater than the set limit. If it is not at 45, the system sets the zone set status to avoid the need to shed. If it is at 46 a determination is made as to the zone shed status. If it is not shed at 47, a determination is made as to whether zone have been shed during this iteration.

If the zone status shed at 46 indicates that there has been a shed the necessary timing function is brought into play at 50. A zone timer is then started at 51. If the zone timer 51 is active, an exit to a common increment zone counter 52 is made. If not, an issue of an integral reset command is made at 53, and a reset of the zone interval timer is accomplished.

A parallel function occurs if the block 47 indicates that no other zones have shed during this reiteration as indicated at function 54. In that case an issue of integral reset command occurs, a start zone interval timer is activated, and a set zone status to shed function is initiated. All of these functions then feed to the increment zone counter and the cycle restarts.

Very simply, the present invention utilizes load sensing for a commercial building along with a microcomputer to accept inputs about various zones and to control outputs to various zone modules or thermostats. One of the outputs to the zone modules or thermostats is an integral reset function so that the integral reset of the individual modules can be decremented by an interstage differential to drop a single stage of cooling. The thermostats or modules are sequenced in an appropriate order to drop load as is requried. After a sufficient period of time the integral reset function disappears and the thermostats or modules are brought up to normal operating conditions providing no overload of the power limit is occuring. In the event that further reduction of power is required, the decrementing of the modules can be accomplished at rather long intervals. Since the integral reset action is a timed function within each of the modules, the return to normal is a random return to normal and all of the various stages of environmental control or cooling system are not brought on at the same time thereby avoiding a sudden peak load on the electrical system for the building 11.

A single implementation of the present invention has been disclosed in detail, but it is clear that other implementations of this concept would be readily apparent to on skilled in this control art. For this reason, the inventors wish to be limited in the scope of their invention solely by the scope of the appended claims.

The embodiments of the invention in which an exclusive property or right is claimed are defined as follows:

1. A temperature control system for an environmentally controlled space having a central demand limit controller, including: thermostat means with said thermostat means including proportional error means and integral error means; said central demand limit controller connected to said thermostat means with said central demand control means being capable of remotely changing an integral error of said integral error means; electrical load sensing means for sensing an electrical demand including electrical power drawn by environmental conditioning means for said controlled space; and said central demand limit controller periodically decrementing said integral error by a fixed amount upon electrical demand for said space exceeding a predetermined limit.

2. A temperature control system as claimed in claim 1 wherein said environmental conditioning mean has a plurality of stages that are capable of being sequentially activated with said activation being separated by interstage temperature differentials; and said fixed amount of decrementing of said integral error being equal to said interstage temperature differential.

3. A temperature control system as claimed in claim 2 wherein said environmental conditioning means is an electrically operated air conditioning means having a plurality of stages of cooling.

4. A temperature control system as claimed in claim 3 wherein said electrical load sensing means is a watt transducer or watt-hour pulse meter.

5. A temperature control system as claimed in claim 1 wherein said controlled space includes a plurality of individual zones; said thermostat means includes a plurality of thermostats with a thermostat in each of said individual zones; said environmental conditioning means including a plurality of multistage cooling units with a cooling unit for each individual zone; each cooling unit for a zone connected to one of said individual thermostats to control the temperature for said zone; and each of said cooling units having a plurality of stages that are capable of being sequentially activated.

6. A temperature control system as claimed in claim 5 wherein said plurality of multistage cooling units are capable of being sequentially activated with said activation being separated by interstage temperature differentials; and said fixed amount of decrementing of said integral error being equal to said interstage differential.

7. A temperature control system as claimed in claim 6 wherein said electrical load sensing means is a watt transducer or watt-hour pulse meter.

* * * * *